(12) United States Patent
Huang et al.

(10) Patent No.: US 12,130,359 B2
(45) Date of Patent: Oct. 29, 2024

(54) ULTRASONIC IMAGING BY SPARSE SAMPLING AND ASSOCIATED DEVICES, SYSTEMS, AND METHODS

(71) Applicant: KONINKLIJKE PHILIPS N.V., Eindhoven (NL)

(72) Inventors: Sheng-Wen Huang, Ossining, NY (US); Changhong Hu, Bothell, WA (US); Douglas Robert Maxwell, Woodinville, WA (US); David Hope Simpson, Bothell, WA (US); James Robertson Jago, Seattle, WA (US); Francois Guy Gerard Marie Vignon, Andover, MA (US); Jun Seob Shin, Winchester, MA (US); Xiaowen Hu, Bothell, WA (US); Unmin Bae, Kenmore, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 255 days.

(21) Appl. No.: 17/053,945

(22) PCT Filed: May 7, 2019

(86) PCT No.: PCT/EP2019/061611
§ 371 (c)(1),
(2) Date: Nov. 9, 2020

(87) PCT Pub. No.: WO2019/215115
PCT Pub. Date: Nov. 14, 2019

(65) Prior Publication Data
US 2021/0219952 A1 Jul. 22, 2021

Related U.S. Application Data

(60) Provisional application No. 62/668,838, filed on May 9, 2018.

(51) Int. Cl.
*G01S 15/89* (2006.01)
*G01S 7/52* (2006.01)

(52) U.S. Cl.
CPC ...... *G01S 15/8927* (2013.01); *G01S 7/52034* (2013.01); *G01S 7/52046* (2013.01); *G01S 7/52085* (2013.01)

(58) Field of Classification Search
CPC ..... A61B 8/14; A61B 8/4488; G01S 15/8927; G01S 15/8915; G01S 7/52085
See application file for complete search history.

(56) References Cited

U.S. PATENT DOCUMENTS

| 5,617,862 | A |   | 4/1997 | Cole et al. |
| 5,902,241 | A | * | 5/1999 | Seyed-Bolorforosh ...... G01S 15/8927 600/443 |

(Continued)

FOREIGN PATENT DOCUMENTS

| EP | 0012165 A1 | 6/1980 |
| JP | H0663013 U | 9/1994 |

OTHER PUBLICATIONS

Erstad et al., "An Approach to the Design of Sparse Array Systems", 1994, Ultrasonics Symposium, pp. 1507-1510 (Year: 1994).*

(Continued)

*Primary Examiner* — Adil Partap S Virk

(57) ABSTRACT

Systems, devices, and methods for ultrasonic imaging by sparse sampling are provided. In one embodiment, an ultrasound imaging system comprises an array of ultrasound transducer elements, electronic circuitry in communication with the array of ultrasound transducer elements and configured to select a first receive aperture of the array comprising a plurality of contiguous ultrasound transducer elements and at least one non-contiguous ultrasound transducer element, and a beamformer in communication with the (Continued)

electronic circuitry. Each ultrasound transducer element of the first receive aperture is configured to receive reflected ultrasound echoes and generate an electrical signal representative of imaging data. The beamformer is configured to receive the electrical signals generated by the first receive aperture and apply different weight to the electrical signals generated by the contiguous ultrasound transducer elements and the electrical signal generated by the at least one non-contiguous ultrasound transducer element.

16 Claims, 12 Drawing Sheets

(56) References Cited

U.S. PATENT DOCUMENTS

| | | | |
|---|---|---|---|
| 6,695,784 B1* | 2/2004 | Michaell | A61B 8/0808 |
| | | | 600/453 |
| 7,125,384 B2 | 10/2006 | Nishigaki et al. | |
| 7,285,094 B2* | 10/2007 | Nohara | G01S 7/52047 |
| | | | 600/447 |
| 2002/0080683 A1* | 6/2002 | Chiang | H01Q 3/26 |
| | | | 367/138 |
| 2003/0069504 A1* | 4/2003 | Wilkening | A61B 8/481 |
| | | | 600/443 |
| 2006/0058672 A1* | 3/2006 | Klepper | G01S 15/8915 |
| | | | 600/447 |
| 2008/0114255 A1* | 5/2008 | Schwartz | A61B 8/4483 |
| | | | 600/474 |
| 2012/0281502 A1* | 11/2012 | Tsushima | G01S 15/8927 |
| | | | 367/87 |
| 2012/0310096 A1 | 12/2012 | Hongou et al. | |

OTHER PUBLICATIONS

Holm et al., "Properties of the Beampattern of Weight- and Layout-Optimized Sparse Arrays", 1997, IEEE Transactions on Ultrasonics, Ferroelectrics, and Frequency Control, vol. 44 No. 5, Sep. 1997 (Year: 1997).*
Mikla et al., "Medical Imaging Technology", 2013 (Year: 2013).*
BMUS, "The History of Ultrasound", 2023 (Year: 2023).*
International Search Report and Written Opinion for International Application No. PCT/EP2019/061611, filed May 7, 2019, 17 pages.

* cited by examiner

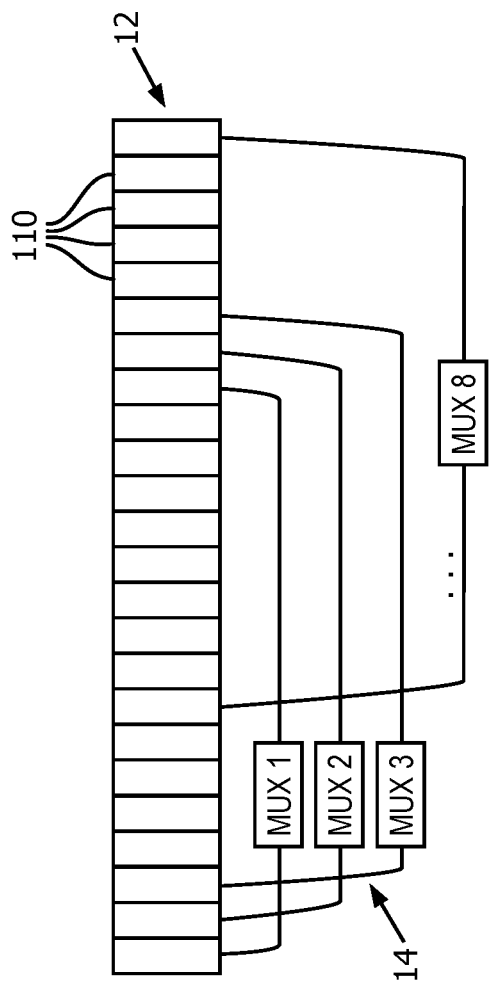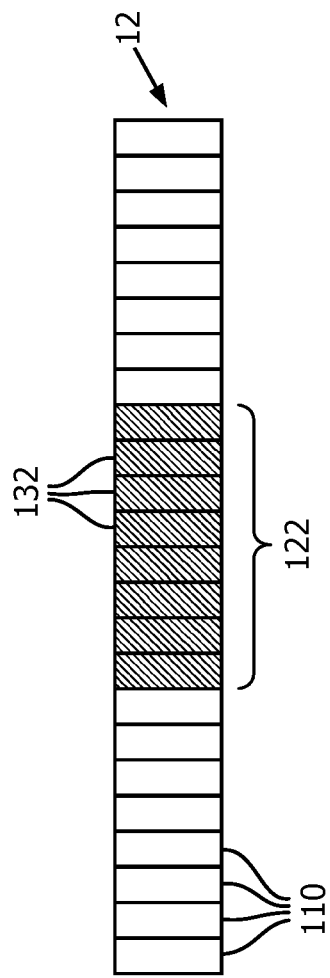

ULTRASONIC IMAGING BY SPARSE SAMPLING AND ASSOCIATED DEVICES, SYSTEMS, AND METHODS

RELATED APPLICATIONS

This application is the U.S. National Phase application under 35 U.S.C. § 371 of International Application No. PCT/EP2019/061611, filed on May 7, 2019, which claims the benefit and priority to Provisional Application No. 62/668,838, filed May 9, 2018. These applications are hereby incorporated by reference herein, for all purposes.

TECHNICAL FIELD

The present disclosure relates generally to ultrasound systems and methods for obtaining ultrasound images of an anatomy. For example, an ultrasound system can include an ultrasound imaging device having an array of ultrasound transducer elements in communication with a multiplexer circuit.

BACKGROUND

Ultrasound imaging is frequently used to obtain images of internal anatomical structures of a patient. Ultrasound systems typically comprise an ultrasound transducer probe that includes one or more ultrasound transducer elements. An ultrasound transducer element is activated to vibrate at ultrasonic frequencies to transmit ultrasonic energy into the patient's anatomy, and then receive ultrasonic echoes reflected by the patient's anatomy to create an image. Each transmit/receive cycle may produce a single scan, or line, of imaging data. By incrementally changing the scanning direction, a two-dimensional image can be compiled from the series of scans, sometimes referred to as A-line scans. The two-dimensional image compiled from the series of A-line scans can be referred to as a B-mode image. This process of compiling B-mode images from a series of A-line scans can be repeated several times a second (e.g., 30/s) to create a live view of the imaged anatomy.

One method of controlling the directionality of each ultrasound scan involves using an array of ultrasound transducers. For example, an ultrasound transducer probe can include an array of ultrasound transducer elements in communication with a beamformer that controls the precise timing of individual ultrasound transducer elements to produce an ultrasound interference pattern that results in a focused beam of ultrasonic energy. Similarly, the beamformer can apply delays to electrical signals generated by individual ultrasound transducer elements in the array in response to receiving ultrasound echoes reflected from the anatomy to focus the received echoes into beams of reflected ultrasound energy.

Ultrasound probes can include one-dimensional or two-dimensional arrays of ultrasound transducer elements. The number of individual ultrasound transducer elements can be in the tens, hundreds, or even thousands. For example, even a one-dimensional array may include more than a hundred individual ultrasound transducer elements, each transducer configured to generate signals used to compile an ultrasound image. In some cases, the amount of data generated by the large array of ultrasound transducer elements can be challenging to communicate to other parts of the ultrasound imaging system, such as the beamformer and signal processor. Hardware and regulatory limitations can also provide obstacles to effectively using ultrasound devices to obtain and process the vast amount of ultrasound imaging data. Although some methods, such as multiplexing, can be used to overcome some of these obstacles, use of such tools can result in image artifacts and degraded image quality.

SUMMARY

Systems, devices, and methods for ultrasonic imaging by sparse sampling are provided. Sparse sampling refers to activating a group, or aperture, of ultrasound transducer elements of an ultrasound transducer array to transmit and/or receive ultrasound energy in which one or more of the activated ultrasound transducer elements is/are non-contiguous with the other activated ultrasound transducer elements. In other words, in a sparsely-sampled aperture of an ultrasound transducer array, one or more activated elements are separated by one or more inactive elements, leading to relatively wider apertures. For example, an ultrasound imaging system can include an ultrasound imaging probe including an array of ultrasound transducer elements in communication with electronic circuitry, such as a multiplexer circuit. The electronic circuitry can be configured to activate a first aperture, or group of ultrasound transducer elements of the array, to transmit ultrasound energy into an anatomy, and an expanded second aperture including one or more sparsely-sampled ultrasound transducer elements to receive ultrasound echoes reflected from the anatomy. The system can also apply varying weight to electrical signals generated by the ultrasound transducer elements in the second aperture. By receiving the ultrasound echoes with the expanded, sparsely-sampled, weighted aperture, which is wider in a lateral dimension than the transmit aperture, lateral resolution of the image can be improved without increasing the number of communication channels needed to transmit electrical signals generated by each aperture to a processing system.

In one embodiment, an ultrasound imaging system comprises an array of ultrasound transducer elements extending along a dimension, electronic circuitry in communication with the array of ultrasound transducer elements and configured to select a first receive aperture of the array comprising a plurality of contiguous ultrasound transducer elements, and at least one non-contiguous ultrasound transducer element, wherein each ultrasound transducer element of the first receive aperture is configured to receive ultrasound echoes reflected from an anatomy and generate an electrical signal representative of imaging data, and a beamformer in communication with the electronic circuitry. The beamformer is configured to receive the electrical signals generated by the ultrasound transducer elements of the first receive aperture and apply different weight to the electrical signals generated by the plurality of contiguous ultrasound transducer elements and the electrical signal generated by the at least one non-contiguous ultrasound transducer element.

In some embodiments, the beamformer is configured to apply greater weight to the electrical signal generated by the at least one non-contiguous transducer element of the first receive aperture than to the electrical signals generated by the plurality of contiguous transducer elements of the first receive aperture. The beamformer can be configured to weight the electrical signal generated by the at least one non-contiguous ultrasound transducer element of the first receive aperture by a factor of two relative to the electrical signals generated by the plurality of contiguous ultrasound transducer elements of the first receive aperture. In some embodiments, the first receive aperture comprises a plurality of non-contiguous ultrasound transducer elements positioned on one or more sides of the plurality of contiguous ultrasound transducer elements. The first receive aperture can be symmetrical, such that the first receive aperture comprises a same number of non-contiguous ultrasound transducer elements on each side of the plurality of contiguous ultrasound transducer elements.

In other embodiments, the electronic circuitry is configured to select a transmit aperture comprising only contiguous ultrasound transducer elements to transmit ultrasound energy into the anatomy. The beamformer can be configured to provide a transmit signal for each of the contiguous ultrasound transducer elements of the transmit aperture, and to apply different weight to at least one transmit signal. In other embodiments, the electronic circuitry is configured to select the first receive aperture to receive the reflected ultrasound echoes from a first focal zone in the anatomy, and to select a second receive aperture different from the first receive aperture to receive ultrasound echoes reflected from a second focal zone in the anatomy, wherein the second receive aperture comprises a plurality of non-contiguous ultrasound transducer elements, and wherein the second receive aperture is wider in the dimension than the first receive aperture. The second receive aperture can comprise more non-contiguous ultrasound transducer elements than the first receive aperture, in some aspects. The electronic circuitry can include a multiplexer, and the system can be configured to switch a multiplexer configuration to select the second receive aperture. Furthermore, the beamformer can be configured to receive the electrical signals transmitted by the second receive aperture, and apply different weight to the electrical signals generated by at least one ultrasound transducer element of the second receive aperture.

In some aspects, the ultrasound imaging system comprises a plurality of communication channels communicatively positioned between the electronic circuitry and a processing system, the plurality of communication channels configured to transmit electrical signals generated by the ultrasound transducer elements of the first aperture to the processing system, wherein a quantity of ultrasound transducer elements of the array is greater than a quantity of the plurality of communication channels.

In another embodiment, a method for ultrasound imaging includes selecting, by electronic circuitry in communication with an array of ultrasound transducer elements extending along a dimension, a first receive aperture of the array of ultrasound transducer elements to receive ultrasound echoes reflected from an anatomy and generate electrical signals representative of imaging data, the first receive aperture comprising a plurality of contiguous ultrasound transducer elements and at least one non-contiguous ultrasound transducer element, receiving, by a beamformer in communication with the electronic circuitry, electrical signals generated by the ultrasound transducer elements of the first receive aperture, and applying, by the beamformer, different weight to electrical signals generated by the plurality of contiguous elements and an electrical signal generated by the at least one non-contiguous ultrasound transducer element.

In some embodiments, the applying different weight comprises applying greater weight to the electrical signal generated by the at least one non-contiguous ultrasound transducer element than to the electrical signals generated by the plurality of contiguous elements. The applying different weight can include weighting the electrical signal generated by the at least one non-contiguous element by a factor of two relative to the electrical signals generated by the plurality of contiguous elements. Furthermore, the selecting the first receive aperture can include receiving the ultrasound echoes reflected from a first focal zone in the anatomy. In some embodiments, the method further includes selecting, by the electronic circuitry, a second receive aperture different from the first receive aperture to receive ultrasound echoes reflected from a second focal zone in the anatomy and generate electrical signals representative of the imaging data, the second receive aperture comprising a plurality of non-contiguous ultrasound transducer elements. The second receive aperture can comprise only non-contiguous ultrasound transducer elements, in some aspects. In other embodiments, the electronic circuitry comprises a multiplexer, and the selecting the second receive aperture includes switching a multiplexer configuration.

In still other embodiments, the method further includes receiving, by the beamformer, the electrical signals generated by the ultrasound transducer elements of the second receive aperture, and applying different weight to the electrical signals generated by at least one ultrasound transducer element of the second receive aperture.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 2 is a diagrammatic view of an array of a multiplexer circuit in communication with an array of ultrasound transducer elements, according to aspects of the present disclosure.

FIG. 3 is a diagrammatic view of the array of FIG. 2 with a transmit aperture activated to transmit ultrasound energy, according to aspects of the present disclosure.

DETAILED DESCRIPTION

Figure 1A:
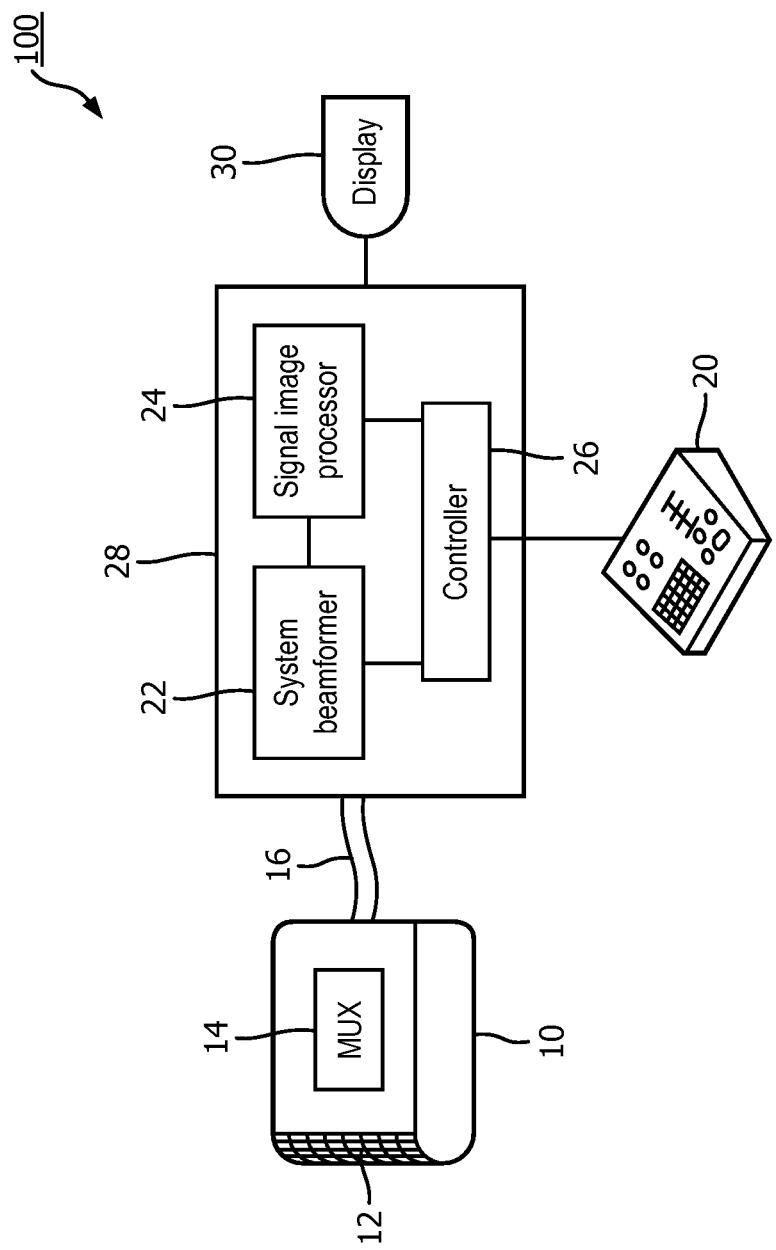
FIG. 1A is a diagrammatic schematic view of an ultrasound imaging system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In FIG. 1A, an ultrasound system 100 according to embodiments of the present disclosure is shown in block diagram form. A probe 10 has a transducer array 12 comprising a plurality of ultrasound transducer elements. The array may be planar or curved as shown in this example. The ultrasound transducer elements may comprise piezoelectric/piezoresistive elements, piezoelectric micromachined ultrasound transducer (PMUT) elements, capacitive micromachined ultrasound transducer (CMUT) elements, and/or any other suitable type of ultrasound transducer elements. The ultrasound transducer elements of the array 12 are in communication with (e.g., electrically coupled to) electronic circuitry 14. In some embodiments, such as the embodiment of FIG. 1A, the electronic circuitry 14 can comprise a signal selector and/or a multiplexer (MUX). The electronic circuitry 14, or MUX, is located in the probe 10 and communicatively coupled to the transducer array 12. In some embodiments, one or more components of the electronic circuitry 14 can be positioned in the probe 10. In some embodiments, one or more components of the electronic circuitry 14, or MUX, can be positioned in the processing system 28. In some aspects, some components of the electronic circuitry 14 are positioned in the probe 10 and other components of the electronic circuitry 14 are positioned in the processing system 28. The MUX 14 may comprise one or more electrical switches, transistors, programmable logic devices, or other electronic components configured to combine and/or continuously switch between a plurality of inputs to transmit signals from each of the plurality of inputs across one or more common communication channels. The MUX 14 may be coupled to elements of the array 12 by a plurality of communication channels. Although referred to as a single MUX 14, the MUX 14 may comprise a plurality of MUXs or MUX circuits. The MUX 14 is coupled to a cable 16, which transmits the multiplexed signals to the processing system 28.

In the processing system 28, the multiplexed signals are digitized and coupled to channels of a system beamformer 22, which appropriately delays each signal. The delayed signals are then combined to form a coherent steered and focused receive beam. System beamformers may comprise electronic hardware components, hardware controlled by software, or a microprocessor executing beamforming algorithms. In that regard, the beamformer 22 may be referenced as electronic circuitry. In some embodiments, the beamformer 22 can be a system beamformer, such as the system beamformer 22 of FIG. 1A, or it may be a beamformer implemented by circuitry within the ultrasound probe 10. In some embodiments, the system beamformer 22 works in conjunction with a microbeamformer disposed within the probe 10. The beamformer 22 can be an analog beamformer in some embodiments, or a digital beamformer in some embodiments. In the case of a digital beamformer, the system includes A/D converters which convert analog signals from the array 12 into sampled digital echo data. The beamformer 22 generally will include one or more microprocessors, shift registers, and or digital or analog memories to process the echo data into coherent echo signal data. Delays are effected by various means such as by the time of sampling of received signals, the write/read interval of data temporarily stored in memory, or by the length or clock rate of a shift register as described in U.S. Pat. No. 4,173,007 to McKeighen et al., the entirety of which is hereby incorporated by reference herein. Additionally, in some embodiments, the beamformer can apply appropriate weight to each of the signals generated by the array 12. The beamformed signals from the image field are processed by a signal and image processor 24 to produce 2D or 3D images for display on an image display 30. The signal and image processor 24 may comprise electronic hardware components, hardware controlled by software, or a microprocessor executing image processing algorithms. It generally will also include specialized hardware or software which processes received echo data into image data for images of a desired display format such as a scan converter. In some embodiments, beamforming functions can be divided between different beamforming components. For example, in some embodiments, the system 100 can include a microbeamformer located within the probe 10 and in communication with the system beamformer 22. The microbeamformer may perform preliminary beamforming and/or signal processing that can reduce the number of communication channels required to transmit the receive signals to the processing system 28.

Control of ultrasound system parameters such as probe selection, beam steering and focusing, and signal and image processing is done under control of a system controller 26 which is coupled to various modules of the system 100. The system controller 26 may be formed by application specific integrated circuits (ASICs) or microprocessor circuitry and software data storage devices such as RAMs, ROMs, or disk drives. In the case of the probe 10, some of this control information may be provided to the MUX 14 from the processing system 28 over the cable 16, conditioning the MUX 14 for operation of the array as required for the particular scanning procedure. The user controls these operating parameters by means of a control panel 20.

Figure 1B:
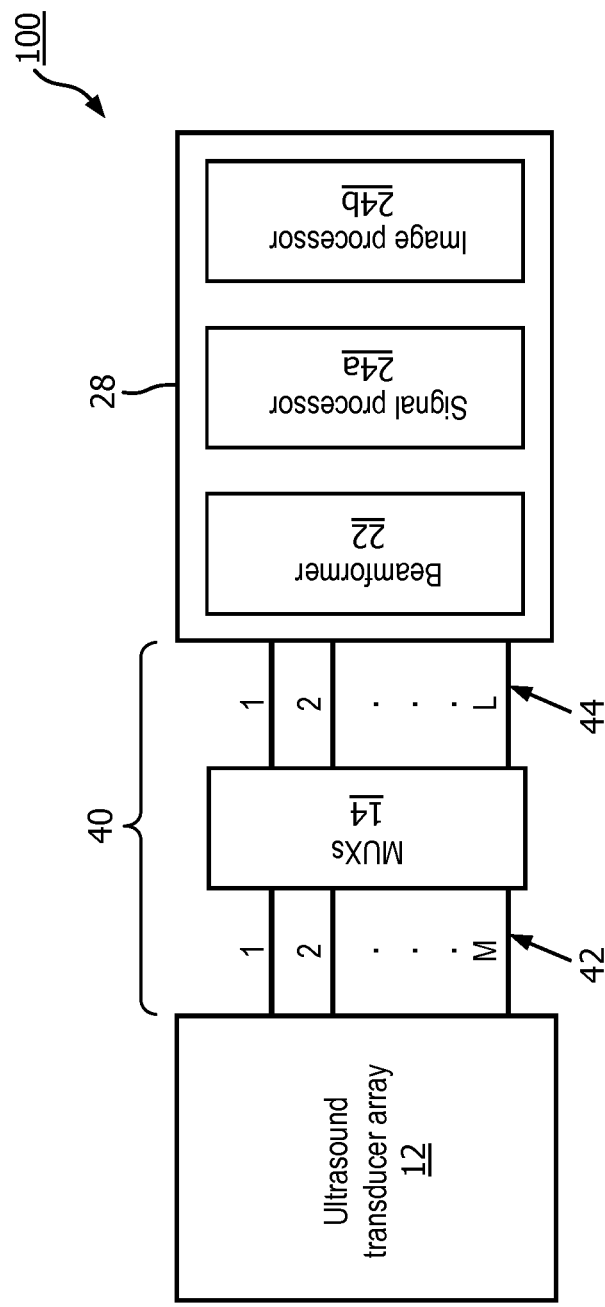
FIG. 1B is a diagrammatic view of an ultrasound imaging system, according to aspects of the present disclosure.

FIG. 1B depicts an alternate view of the ultrasound imaging system 100 shown in FIG. 1A. As shown in FIG. 1B, the array 12 is communicatively coupled to the processing system 28 via a communication subsystem 40, which comprises a first plurality of communication channels 42, a second plurality of communication channels 44, and electronic circuitry 14 comprising one or more MUXs. The first plurality communication channels 42 communicatively couples the elements of the array 12 to the MUXs 14, and may include physical components, such as conductors, fiber optic cables, wires, etc. The second plurality of communication channels 44 communicatively couple the MUXs 14 to the processing system 28, and may also comprise physical components such as conductors, fiber optic cables, wires, etc. For example, the second plurality of communication channels may comprise the cable 16 extending between the probe 10 and the processing system 28. In some embodiments, the MUXs 14 can combine signals generated by multiple ultrasound transducer elements to transmit the combined signals over a common conductor. In some embodiments, the system further includes a demultiplexler configured to separate the combined signal back into its constituent parts. For example, the second plurality of communication channels 44 can be partially defined or characterized by time (e.g. time-division multiplexing), frequency (frequency-division multiplexing), or other parameters. The demultiplexer separates individual signals sent along a common conductor using time, frequency, or other parameters used to combine the signals.

In the embodiment shown in FIG. 1B, the first plurality of communication channels 42 comprises more channels than the second plurality of communication channels 44. In that regard, the first plurality 42 comprises M channels, while the second plurality 44 comprises L channels. For example, in some embodiments, the array 12 may comprise 320 ultrasound transducer elements, with each element communicatively coupled to the MUXs 14 by a separate communication channel. Thus, the first plurality 42 may comprise 320 communication channels. By contrast, the second plurality of communication channels 44 may comprise fewer than 320 channels, such as 128 channels. The number of available channels in the second plurality 44 may be constrained by hardware limitations, such as the size of the cable 16 and the hardware and/or processing capacity of the processing system 28. Increasing the number of communication channels of the second plurality 44 to equal or surpass the number of ultrasound transducer elements may not be practical in some circumstances. Accordingly, the MUXs 14 provide for varying elements of the array 12 to be in communication with the processing system 28 at a given time.

In some instances, the array 12 may include any number of acoustic elements. For example, the array 12 can include between 1 acoustic element and 1000 acoustic elements, including values such as 2 acoustic elements, 4 acoustic elements, 36 acoustic elements, 64 acoustic elements, 128 acoustic elements, 500 acoustic elements, 812 acoustic elements, and/or other values both larger and smaller. In some instances, the acoustic elements of the array 12 may be arranged in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5D array), or a two-dimensional (2D) array. The array of acoustic elements (e.g., one or more rows, one or more columns, and/or one or more orientations) that can be uniformly or independently controlled and activated. The array 12 can be configured to obtain one-dimensional, two-dimensional, and/or three-dimensional images of patient anatomy.

FIGS. 2-8 show various configurations and statuses of an array 12 of ultrasound transducer elements 110. The array 12 shown in FIGS. 2-8 is a one-dimensional array comprising twenty four ultrasound transducer elements 110. In a preferred embodiment, the array 12 may comprise more than twenty four ultrasound transducer elements, such as 64, 120, 160, or 320 transducer elements. In other embodiments, the array 12 may be a 1.25-dimensional array, a 1.5-dimensional array, or a 2-dimensional array comprising hundreds, or even thousands of individual ultrasound transducer elements. However, for simplicity and explanatory purposes, the array 12 of FIGS. 2-8 comprises twenty four ultrasound transducer elements in a one-dimensional configuration, extending in a lateral direction.

Referring to FIG. 2, the array 12 comprises twenty four ultrasound transducer elements 110 in communication with electronic circuitry 14 comprising a plurality of multiplexers, or MUXs. For the purposes of the present disclosure, the term MUX may be used to refer to a multiplexer circuit comprising a plurality of individual MUXs, or may be used to refer to each individual MUX configured to select between two or more multiplexed elements. In the embodiment of FIG. 2, each MUX is communicatively coupled to two ultrasound transducer elements. For example, MUX 1 is communicatively coupled to elements numbered, from left to right, one and seventeen; MUX 2 is communicatively coupled to elements numbered two and eighteen; MUX 3 is communicatively coupled to elements numbered three and nineteen; and so on, to MUX 8, which is communicatively coupled to elements numbered eight and twenty four. Each MUX operates to select one of the two coupled elements, while deselecting the other element. For example, MUX 1 can be configured to select either element one or element seventeen, but not both. As will become clear, although one or more elements are selected by the MUX, not all of the selected elements will be necessarily energized, or activated, to transmit and/or receive ultrasound energy. For example, although an element may be selected, or turned on by a MUX, the processing system, via the beamformer and/or the controller, may not energize the selected MUX. In some embodiments, each individual MUX can be communicatively coupled to three, four, or more elements, and may similarly determine which of the coupled elements is activated to transmit and/or receive electrical signals. The twenty-four elements of the array 12 described with respect to FIGS. 2-8 can be associated with sixteen communication channels, for example. Eight channels can be respectively communicatively coupled to the MUXs 1-8, and eight channels can be respectively communicatively coupled to elements 9-16 of the array 12.

In some aspects, a MUX configuration can at least partially define an aperture comprising a group or portion of the ultrasound transducer elements 110. The aperture can refer to a group or portion of the ultrasound transducer elements 110 of the array 12 that are activated, or energized, to transmit ultrasound energy and/or receive ultrasound echoes. Each aperture may have a width in a dimension, such as a lateral dimension spanning from left to right across the array 12. The width may be described as a distance between the outer most activated ultrasound transducer elements in each aperture, and can be measured or described in terms of a number of elements. In addition to width, length, and other spatial dimensions, apertures may be defined or characterized by a quantity of contiguous and/or non-contiguous elements activated by the MUX. Thus, two apertures may be different even though their widths, the distance between the outer-most ultrasound transducer elements, is the same. For example, an aperture may be as wide as the twenty-four element array 12, but may only include sixteen activated elements; for example, eight non-contiguous elements, and eight contiguous elements. As mentioned above, because not all elements selected by a MUX are activated by the system, two apertures may be different although they are defined by a common MUX configuration.

FIG. 3 shows an activated transmit aperture 122 comprising eight activated and contiguous ultrasound transducer elements. The transmit aperture 122 may be one of many apertures used in a scan sequence to compile or sweep out a two-dimensional B-mode image. The aperture 122 may be activated by a MUX, a processing system, a beamformer, and/or a controller. The transmit aperture 122 comprises only contiguous elements 132. The position of the aperture 122 is toward the center of the array 12. The aperture 122 may shift from right to left between scan line sequences in order to direct ultrasound energy in different directions and to different regions of the anatomy. In addition to a MUX controlling which elements 132 are activated as the aperture 122, a beamformer, such as the beamformer 22 of the processing system 28, may selectively delay one or more elements 132 of the transmit aperture 122 to create a focused beam of ultrasound energy propagating from the aperture 122. Thus, the directionality of the focused beam of ultrasound energy can vary even when the same aperture 122 is activated. Furthermore, although eight elements are shown activated in the aperture 122, in some embodiments, the transmit aperture 122 may comprise more than eight elements selected by the MUX, such as sixteen elements. However, the processing system 28, via the beamformer 22 and/or controller 26, may not activate one or more of the selected elements, such that only some of the elements of the aperture 122 (e.g., eight) are activated to transmit ultrasound energy.

Figure 4:
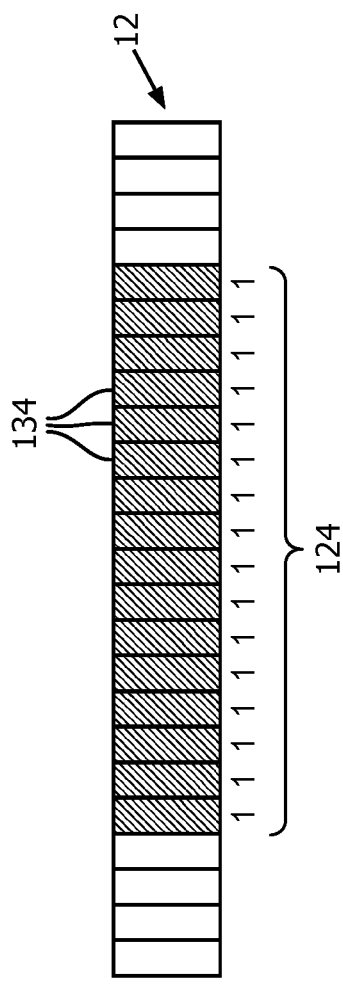
FIG. 4 is a diagrammatic view of the array of FIG. 2, with a receive aperture activated to receive ultrasound echoes reflected from an anatomy, according to aspects of the present disclosure.

FIG. 4 shows a receive aperture 124 comprising sixteen activated ultrasound transducer elements, according to some aspects of the present disclosure. The aperture 124 comprises only contiguous elements 134, which may be selected by the same MUX configuration as the transmit aperture 122 shown in FIG. 3. For example, the transmit aperture 122 shown in FIG. 3 may comprise the same sixteen elements 134 shown in FIG. 4 selected by the MUX, with only eight of the elements activated, while the receive aperture 124 shown in FIG. 4 includes the same sixteen selected elements, with all sixteen elements activated to receive ultrasound echoes. Accordingly, in some embodiments, the receive aperture 124 may be the receiving counterpart of the transmit aperture 122. Each of the elements selected by the MUX is configured to receive reflected ultrasound echoes and generate an electrical signal representative of ultrasound imaging data. The imaging data can be echo data (e.g., prior to being processed for image generation) and/or image data (e.g., after image processing of the echo data).

In some aspects, it can be advantageous to activate a receive aperture that is relatively wider than the corresponding transmit aperture to improve lateral resolution and to reduce image artifacts. For example, the transmit aperture 122 can be configured, in some embodiments, to activate only a portion of the group of elements communicatively coupled to the MUX to achieve sufficient depth of field, while the receive aperture 124 is configured to activate more elements, or all elements, coupled to the MUX.

The array of FIG. 4 is activated with each element equally weighted as 1. The weight of 1 can be described as a normalized measure of the weight or gain applied to electrical signals generated by each element 134. Weighting of electrical signals on receive and/or transmit may be applied by one or more components of a processing system, such as a beamformer and/or a controller. In FIG. 4, the equal weighting is also illustrated by the shade of gray applied to each activated element 134 of the array 12. In other embodiments (see, e.g., FIG. 6), the relative weighting applied to each element of the array 12 may vary across the aperture.

Some existing systems may provide images with poor lateral resolution because there are fewer communication channels than ultrasound transducer elements in the array. Thus, some existing systems may only activate as many transducer elements in the array as there are communication channels. For example, some systems may reduce the number of active elements receiving ultrasound echoes by confining, or narrowing, an aperture to a region of the array. Such narrowed apertures may lead to poor lateral resolution and/or image artifacts. As explained below, the present disclosure advantageously provides for improved image quality, in particular improved lateral resolution, even where there are fewer communication channels than elements in the array.

Figure 5:
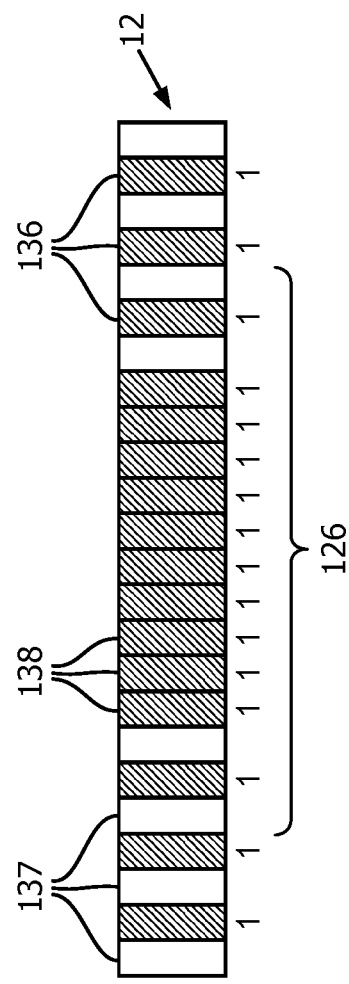
FIG. 5 is a diagrammatic view of the array of FIG. 2, with a sparsely-sampled receive aperture activated to receive ultrasound echoes reflected from an anatomy, according to aspects of the present disclosure.

FIG. 5 shows another activated receive aperture 126, according to some aspects of the present disclosure. The aperture 126 shown in FIG. 5 includes six non-contiguous, or sparse, elements 136, and ten contiguous transducer elements 138. While the aperture 126 includes sixteen active elements, the aperture 126 has a width of twenty two elements. The sparse elements 136 are activated on both sides of the contiguous elements 138. In some aspects, each grouping of sparse elements 136 on the sides of the contiguous elements 138 can be referenced as subapertures. The sparse elements 136 are separated by one or more inactive elements 137 between each sparse element 136. In some embodiments, each sparse element 136 is separated by more than a single inactive element 137. In some embodiments, varying amounts of inactive elements 137 may separate each sparse element 136 along the aperture 126. Similar to the embodiment of FIG. 4, each active element of the aperture 126 is equally weighted to a normalized weight of 1.

Although the aperture 126 of FIG. 5 comprises the same number of active elements as the aperture 124 of FIG. 4, the aperture 126 of FIG. 5 has a width of twenty two elements, while the aperture 124 of FIG. 4 has a width of 16 elements. Accordingly, the aperture 126 of FIG. 5 is relatively wider than the aperture 124 of FIG. 4 even though the number of active elements, and thus, the number of communication channels used to transmit electrical signals between each element and the processing system, remains the same. As mentioned above, activating a receive aperture that is relatively wider than the corresponding transmit aperture can improve image quality in some aspects, including lateral resolution and reduction in image artifacts.

Figure 6:
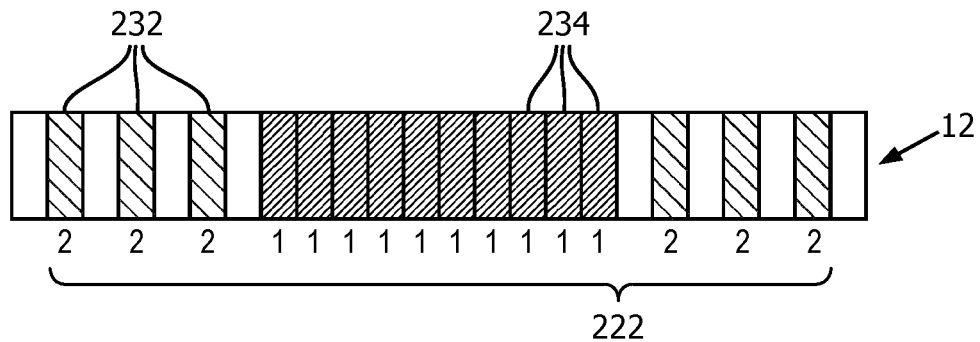
FIG. 6 is a diagrammatic view of the array of FIG. 2, with a weighted, sparsely-sampled receive aperture activated to receive ultrasound echoes reflected from an anatomy, according to aspects of the present disclosure.

Referring now to FIG. 6, an aperture 222 is shown including sixteen active elements, including six sparse elements 232 and ten contiguous elements 234. The aperture 222 is twenty two elements wide. Thus, the arrangement of elements comprising the aperture 222 may be similar or identical to the aperture 126 shown in FIG. 5. However, in FIG. 6, the sparse elements 232 are weighted at twice the amount of the contiguous elements 234, as shown by the corresponding 2 below each sparse element 232, and the darker shading of each of the sparse elements 232 relative to the contiguous 234 elements. Increasing the weight of the sparse elements 232 relative to the contiguous elements 234 can help decrease the width of the main lobe, or beam, thereby improving the lateral resolution of the received ultrasound image. In some aspects, increasing the relative weight of the sparse elements 232 can compensate the aperture apodization profile for the inactive elements separating the sparse elements 232. Apodization of an ultrasonic transducer aperture can be described as a gradual change of the transmit amplitude and/or receive gain from the center of the aperture to the edges of the aperture. In that regard, the relative weights of the active elements may be advantageously adjusted to maintain a weight per unit area consistent with an intended apodization profile for the aperture. The example shown in FIG. 6 may be consistent with a flat (rectangular) receive apodization profile. Other apodization functions (Hamming, Riesz, Taylor, etc.) may be beneficial in some circumstances.

Figure 7:
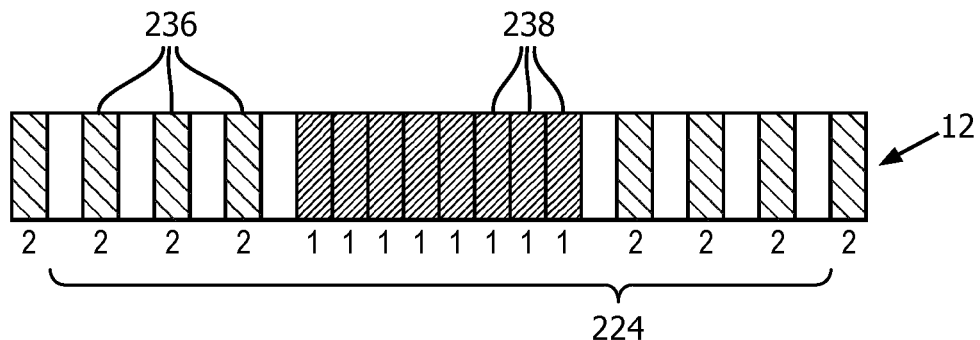
FIG. 7 is a diagrammatic view of the array of FIG. 2, with a weighted, sparsely-sampled receive aperture activated to receive ultrasound echoes reflected from an anatomy, according to aspects of the present disclosure.

FIG. 7 depicts another receive aperture 224 comprising a weighted and sparsely-sampled group of activated ultrasound transducer elements 236, according to some embodiments of the present disclosure. The aperture 224 of FIG. 7 may be similar to the aperture 222 shown in FIG. 6, in some aspects. For example, the aperture 224 of FIG. 7 includes the plurality of sparse elements 236, a plurality of contiguous elements 238, with the sparse elements 236 disposed at the sides of the contiguous elements 238, and being weighted by a factor of two relative to the contiguous elements 238. However, the aperture 224 of FIG. 7 comprises eight sparse elements 236 and eight contiguous elements, and has a width spanning the full twenty-four transducer array 12. Thus, the aperture 224 of FIG. 7 is wider than the aperture 222 of FIG. 6, although it comprises the same number of active elements, and uses the same number of communication channels.

Figure 8:
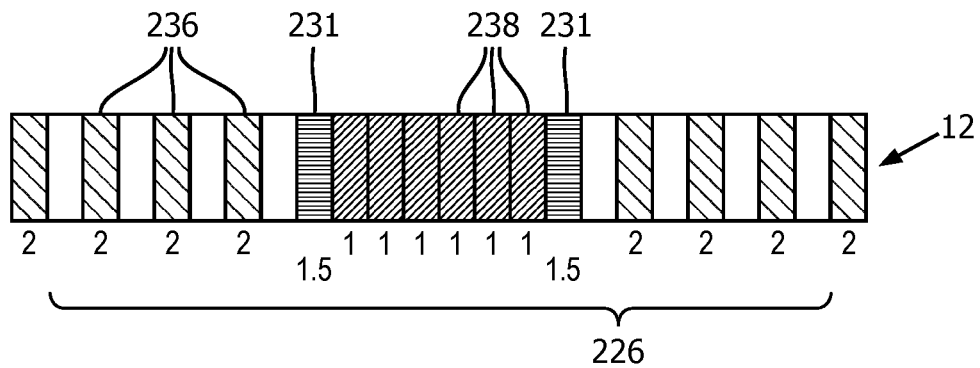
FIG. 8 is a diagrammatic view of the array of FIG. 2, with a weighted, sparsely-sampled receive aperture activated to receive ultrasound echoes reflected from an anatomy, according to aspects of the present disclosure.

FIG. 8 shows a receive aperture 226 of the array 12, according to some embodiments of the present disclosure. The aperture 226 of FIG. 8 comprises the same activated elements as the aperture 224 of FIG. 7. However, in the aperture 226 shown in FIG. 8, outer elements 231 of the contiguous elements 238 are weighted by a factor of 1.5 relative to the other contiguous elements 238. Modifying one or more transducers at or near the lateral ends of the contiguous group of elements 238 may help to improve the quality of the ultrasound image.

Figure 9:
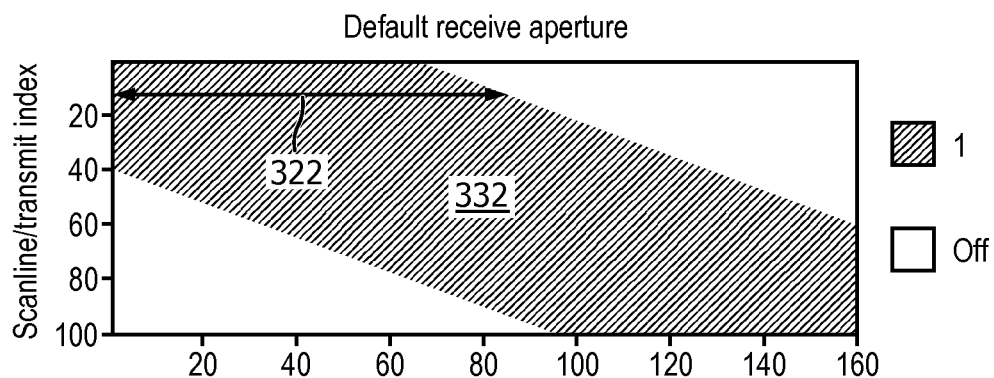
FIG. 9 is a graphical view of an ultrasound scan sequence, according to some aspects of the present disclosure.
Figure 10:
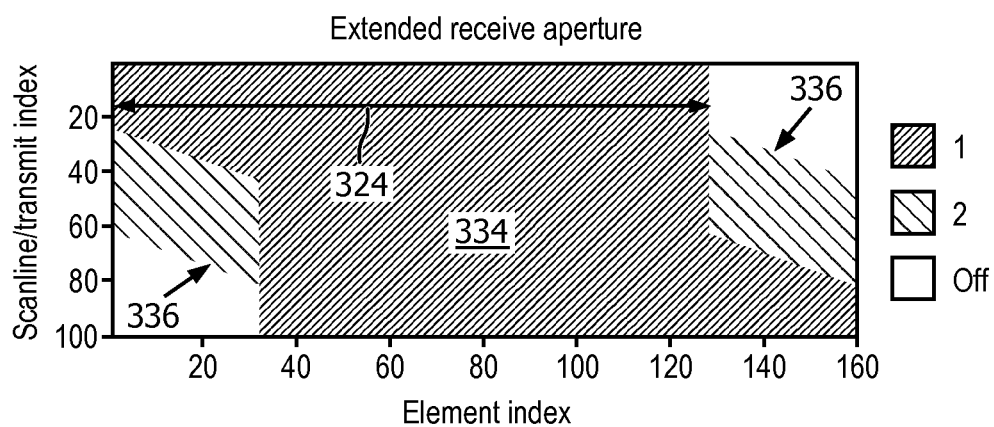
FIG. 10 is a graphical view of a weighted, sparsely-sampled ultrasound scan sequence, according to some aspects of the present disclosure.

FIGS. 9 and 10 are graphical views of an ultrasound imaging scan sequence using a default receive aperture and an extended receive aperture, respectively, according to some embodiments of the present disclosure. For example, the sequence illustrated in FIG. 9 may be carried out using a receive aperture/MUX configuration analogous to that shown in FIG. 4, while the sequence illustrated by FIG. 10 may be carried out using a receive aperture/MUX configuration analogous to that shown in FIG. 6. For example, the sequence shown in FIG. 9 may be performed by activating a series of receive apertures each comprising a group of contiguous ultrasound transducer elements. In FIGS. 9 and 10, the width of the receive aperture is shown as the widths 322, 324 of the colored-in portions. In both FIGS. 9 and 10, the ultrasound transducer array used to receive ultrasound echoes comprises 160 elements, as shown by the lateral axis of each graph. The vertical axis of each graph indicates the corresponding scan line of the sequence. For example, the ultrasound imaging system 100 may activate different apertures across the scan sequence. In some embodiments, at some portions of the scan sequence (e.g., FIG. 10 between scan line 0 and 20), the system may activate the same aperture to receive ultrasound echoes. Although the same aperture is activated for multiple scan line sequences, the system may manipulate the directionality of the focused beam of the ultrasound echoes from one scan line to the next by beamforming the transmit signals and the received echo signals.

In FIG. 9, the width of the colored-in portion 332 is at a maximum between scan lines numbered 40 and 60. In this region, the width 322, representing the number of elements of the aperture, may be between 120 and 130 elements, for example, 128 elements. In some embodiments, the number of elements activated with the receive aperture may correspond to a number of communication channels available to transmit electrical signals to the processing system. For example, the system may comprise 128 available communication channels to transmit electrical signals from the array to the processing system. Transmitting electrical signals generated by the array can be challenging or impractical if the number of activated ultrasound transducer elements exceeds the number of communication channels. Thus, the receive aperture may include as many, or fewer, active elements as available communication channels.

In FIG. 10, the scan sequence is performed using an expanded, sparsely-sampled aperture. Thus, a width 324 of the aperture may be relatively greater at each scan line than the width 322 shown in FIG. 9. The apertures of each scan line between scan lines numbered 20 and 80 each include one or more weighted and/or sparsely sampled elements, shown by sparsely sampled regions 336. In FIG. 10, each element in the sparsely-sampled region is weighted by a factor of two relative to the contiguous region 334, as shown by the relative darker shading of the sparsely-sampled regions 336. Each of the elements of the sparsely-sampled regions 336 are separated by one or more inactive elements, shown with white shading. In some embodiments, the apertures activated between scan lines numbered 20 and 80 may be substantially symmetrical, such that each aperture comprises the same number of sparse elements on either side of the group of contiguous elements. Furthermore, the arrangement (e.g., spacing) of the sparse elements may be symmetrical on both sides of the contiguous portion of the aperture in each scan line. However, in other embodiments, the sparsely-sampled regions 336 may not be symmetrical with respect to the continuous region 334. For example, the apertures of one or more scan lines may comprise more sparsely-sampled elements on one side than on the other, sparse elements may be spaced further apart on one side of the contiguous elements than the other side, the relative weight of the sparsely-sampled elements can differ from one side to the other, etc. In some embodiments, the aperture can have spatially-varying sparseness and weight along the lateral dimension.

Between scan lines numbered 40 and 60, the aperture activated by the ultrasound system has a width spanning all, or nearly all, of the elements in the array. Thus, although only 128 elements are activated with the aperture, the aperture has a width of about 160 elements, due to the widening effect of sparsely sampling at least a portion of the receive aperture.

Figure 11:
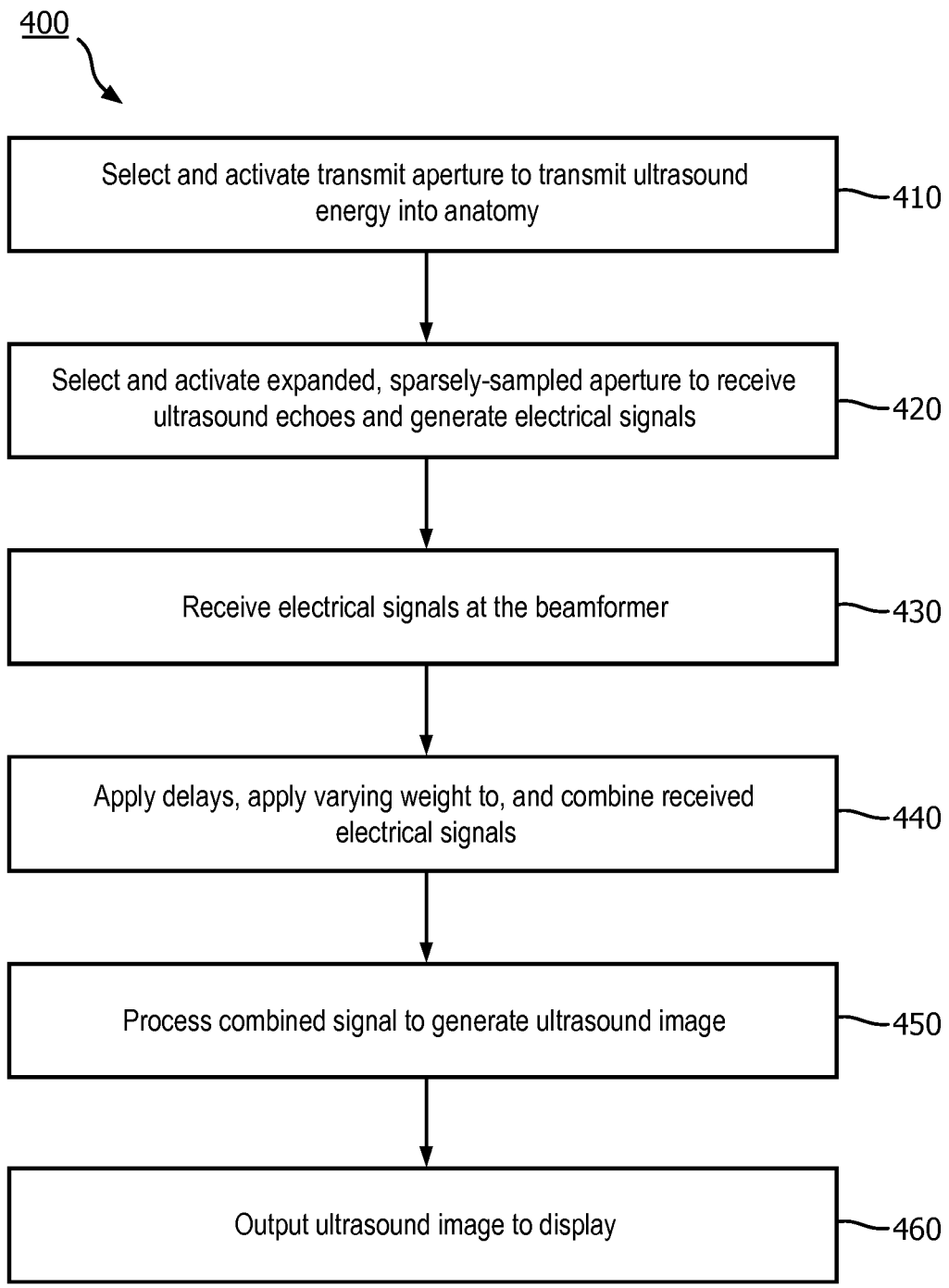
FIG. 11 is a flow chart illustrating a method for obtaining an ultrasound image using a weighted, sparsely-sampled ultrasound scan sequence, according to some aspects of the present disclosure.

An exemplary method 400 of a scanning protocol with an expanded, sparsely-sampled ultrasound transducer array, according to embodiments of the present disclosure, is shown in FIG. 11. One or more steps of the method 400 can be carried out by an ultrasound imaging system, such as the system 100. In step 410, a transmit aperture comprising a plurality of ultrasound transducer elements is selected and activated to transmit ultrasound energy into an anatomy. The transmit aperture may be selected and activated by a MUX, a processing system, a beamformer, a controller, and/or any combination thereof. For example, the beamformer may generate and/or send a plurality of transmit signals for the elements of the transmit aperture that are selected by the MUX, wherein each transmit signal is selectively delayed in order to create a focused beam with a given direction. In some embodiments, the transmit aperture may comprise 32, 64, 128, or any suitable number of transducer elements. In some embodiments, the transmit aperture may comprise mostly contiguous elements, and may include only contiguous elements. In some embodiments, the transmit aperture may also comprise one or more non-contiguous, or sparse, elements. As mentioned above, in some embodiments, not every element selected by the MUX is activated with the transmit aperture.

In step 420, an expanded receive aperture comprising one or more non-contiguous, or sparse, elements is selected and activated to receive ultrasound echoes reflected from the anatomy, and to generate electrical signals representative of ultrasound imaging data. The expanded receive aperture may take the form of those illustrated in FIGS. 5-8, for example. The expanded aperture may comprise the transmit aperture, in some instances. For example, the transmit aperture activated in step 410 and the expanded receive aperture may be defined by a common MUX configuration. However, in the expanded aperture, more elements communicatively selected or turned on by the MUX may be activated. For example, the expanded aperture may comprise a plurality of non-contiguous, or sparse, elements on the sides of a contiguous plurality of elements. Such a configuration, wherein the transmit and receive apertures are defined by a common MUX configuration, may be referred to as a fixed MUX configuration. As described above, in some embodiments, electrical signals generated by the elements of the receive aperture may be given varying weight. For example, the sparse elements may be weighted by a factor or two relative to the contiguous elements. The weighting may be applied by, for example, a beamformer and/or a controller.

In step 430, the electrical signals generated by the receive aperture are transmitted to and received by a beamformer via a communication subsystem. The communication subsystem may comprise a data bus and one or more MUXs. The communication subsystem may be configured to carry the electrical signals by a plurality of communication channels. For example, the communication subsystem may be configured to transmit electrical signals across 128 communication channels. In that regard, each communication channel may transmit electrical signals generated by a single corresponding ultrasound transducer element. Communication channels can comprise hardware components, such as wires, conductors, fiber optic lines, antennas, FPGAs, etc. Communication channels may also be defined by other parameters, such as time, frequency, code, etc.

In step 440, a processing system comprising the beamformer, a controller, and a signal processor beamforms the imaging data contained in the electrical signals by selectively applying varying delays to the electrical signals generated by each of the elements. The beamformer may also apply different or varying weight to each of the signals, as described above. The delayed and/or weighted signals are then combined into a single signal comprising the imaging data, and in step 450, the electrical signals are transmitted to other components, such as a signal processor and/or an image processor, to compile an image which is output to a display in step 460.

The method 400 may describe a scan sequence to obtain a single line of ultrasound imaging data, such as an A-line scan, for example. In that regard, the method 400 may be repeated many times using a plurality of transmit and receive apertures to generate several A-line scans that can be compiled into a two-dimensional image, such as a B-mode image. The system may be configured to repeat this process to generate several B-mode images each second to produce a live ultrasound view of the anatomy.

Figure 12:
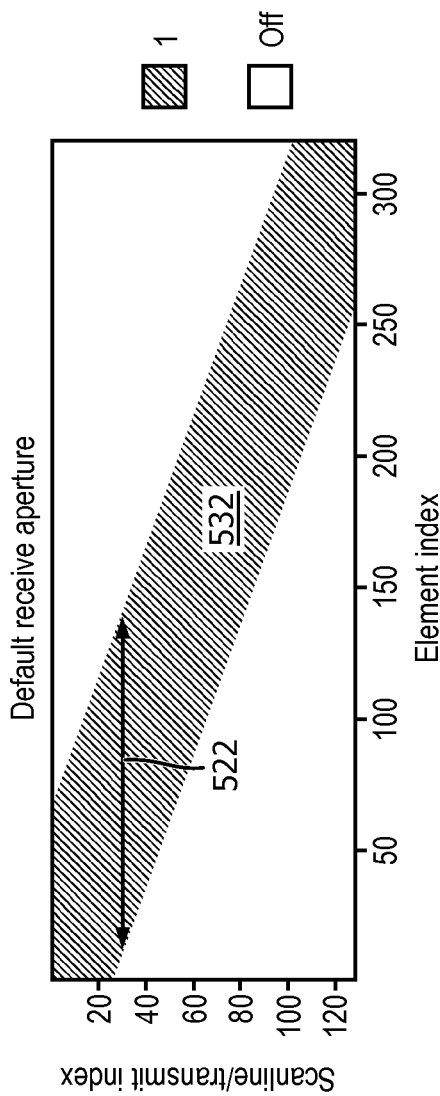
FIG. 12 is a graphical view of an ultrasound scan sequence, according to some aspects of the present disclosure.
Figure 13:
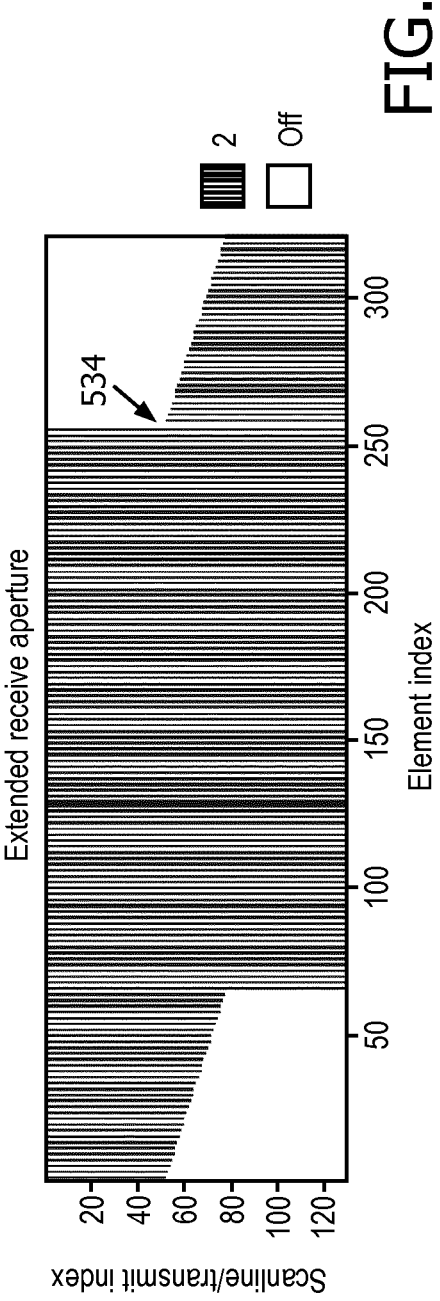
FIG. 13 is a graphical view of a weighted, sparsely-sampled ultrasound scan sequence, according to some aspects of the present disclosure.

FIGS. 12-15 are graphical views of ultrasound imaging scan sequences using an ultrasound transducer array comprising 320 ultrasound transducer elements. In FIG. 12, like FIG. 9, the ultrasound imaging system activates apertures comprising only contiguous elements, as shown by the contiguous region 532. This aperture configuration may be referred to as a default receive aperture. Also like FIG. 9, the maximum width 522 of the contiguous region 532, which can also represent the width of the widest apertures activated by the system, is 128, and each element activated is equally weighted relative to the other elements. Because the width 522 of the aperture of FIG. 12, which uses only contiguous elements, is limited by the number of communication channels, the aperture of FIG. 12 may not produce optimal images. In FIG. 13, by contrast, each aperture comprises a plurality of sparse elements, represented by a sparse region 534. For example, the aperture of each scan line may comprise only sparse elements, in some embodiments. Thus, although the array illustrated in FIG. 13 comprises twice the amount of elements of the array shown in FIGS. 9 and 10 and is coupled to the processing system with a bus having the same number of communication channels (e.g., 128), one or more apertures activated in the sequence of FIG. 13 can have a width of around 250-260 elements, for example, 255 elements. Fully sparse apertures, such as the apertures shown in FIG. 13, may be beneficial to increase aperture width for arrays comprising many more elements than communication channels.

Figure 14:
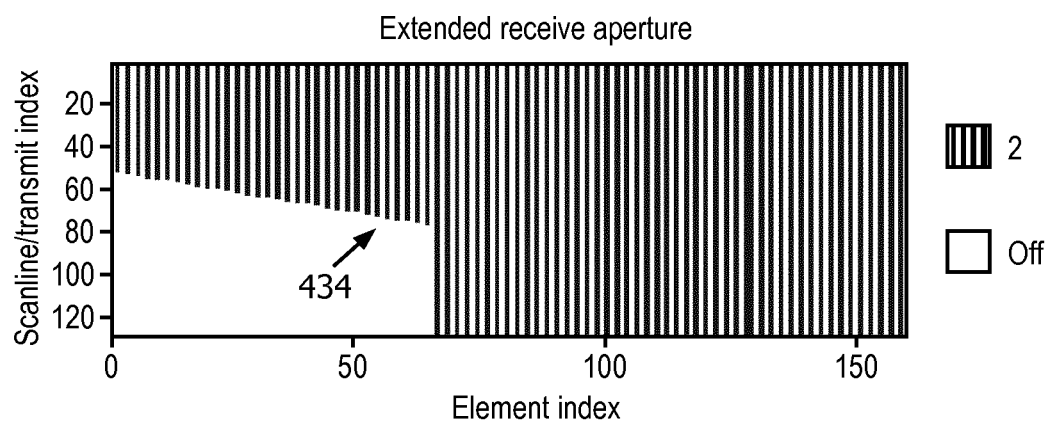
FIG. 14 is a close-up view of a first portion of the graphical view shown in FIG. 13, according to some aspects of the present disclosure.
Figure 15:
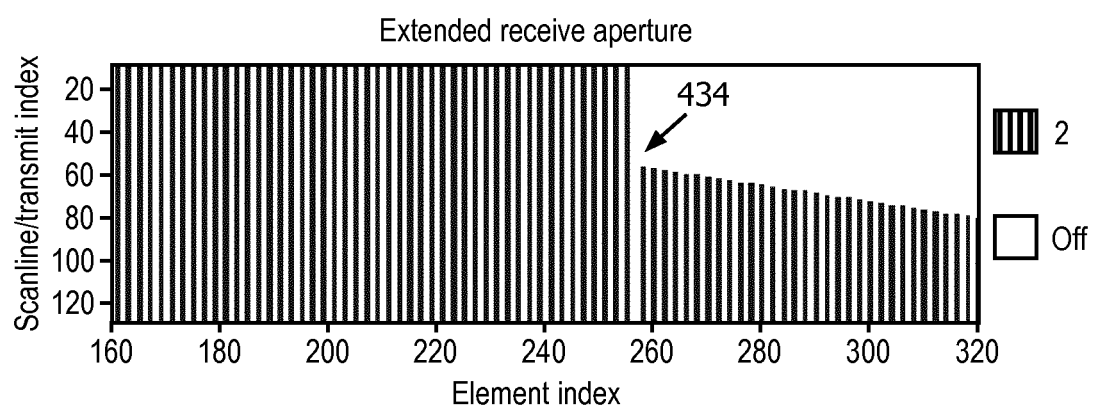
FIG. 15 is a close-up view of a second portion of the graphical view shown in FIG. 13, according to some aspects of the present disclosure.

In FIG. 13, each active element of each aperture is weighted by a factor of two. However, in some embodiments, each element may be equally weighted by a factor of one. FIGS. 14 and 15 depict close-up views of a first portion of the sequence, showing elements 0-160, and a second portion of the sequence, showing elements 161-320.

Using sparsely-sampled groups of elements to transmit ultrasound energy may not be ideal, in that it can lead to degraded image quality by grating lobes. Thus, it may be desirable to select and activate only contiguous, or mostly contiguous, elements during the transmit portion of the scan procedure. However, activating a series of transmit and receive apertures like those shown in FIGS. 12 and 13 may require the system to change MUXs or MUX configurations between the transmit and receive portions of a scan procedure. This process is referred to as MUX switching, in contrast to a fixed MUX configuration (e.g., FIGS. 9 and 10), and can result in image artifacts that appear in the B-mode images in a shallow region of the images near the ultrasound transducer array. For example, artifacts caused by MUX switching may show up in a B-mode image between a depth of 0-10 mm. Thus, MUX switching may not be desirable when relatively shallower structures need to be observed in an ultrasound image. However, by employing a multi-focal zone procedure, shown in FIG. 16, MUX switching can be used in combination with a fixed MUX procedure, such as the procedure described with respect to FIG. 11, to achieve the benefits of both procedures.

Figure 16:
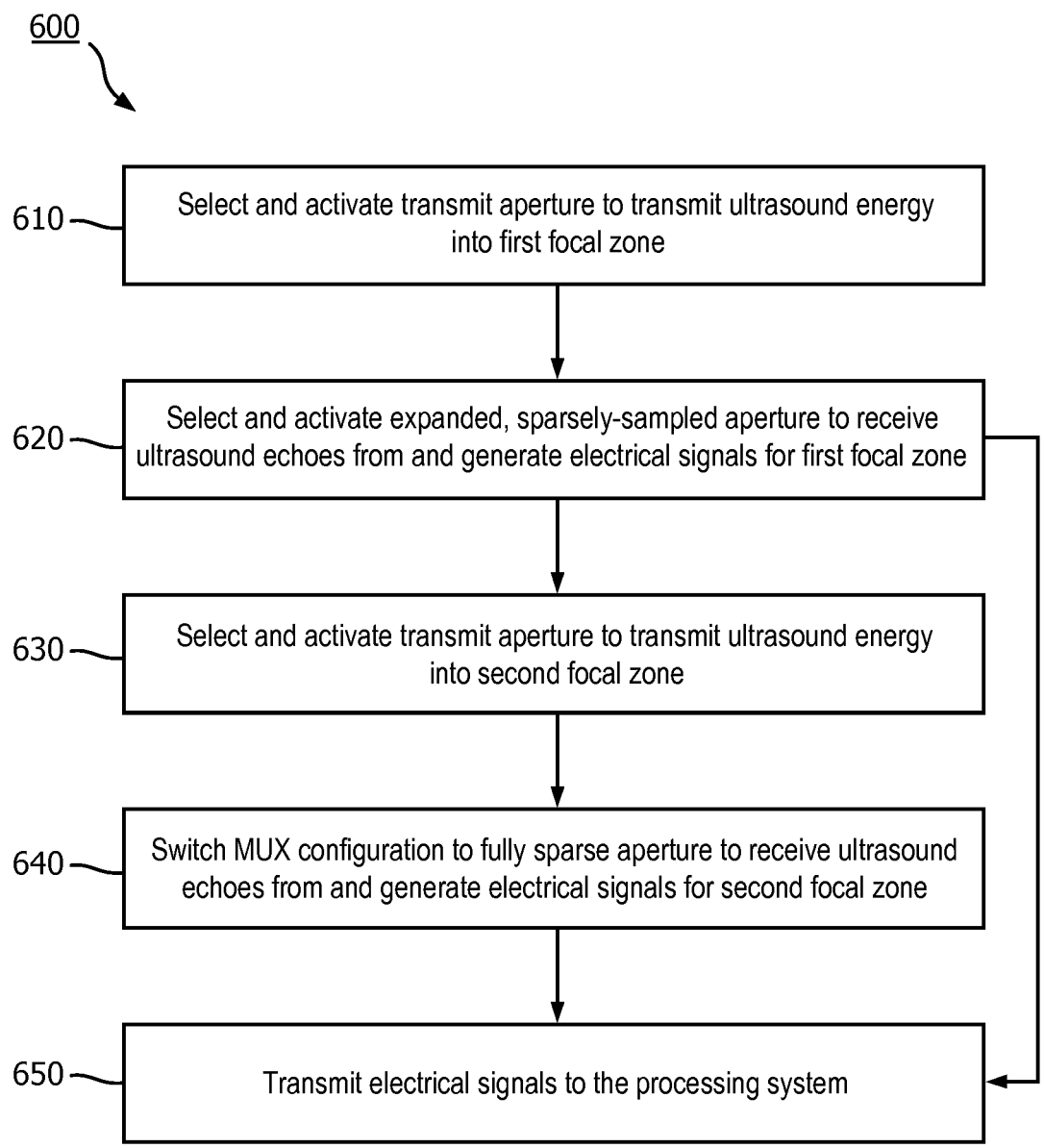
FIG. 16 is a flow chart illustrating a method for obtaining an ultrasound image using a weighted, sparsely-sampled, and multi-focal zone ultrasound scan sequence, according to some aspects of the present disclosure.

A method 600 for multi-focal zone ultrasound imaging, according to some embodiments of the present disclosure, is shown in FIG. 16. One or more steps of the method 600 can be carried out by an ultrasound imaging system, such as the system 100. In step 610, the system selects and activates a transmit aperture to transmit ultrasound energy into a first focal zone. The first focal zone may comprise a shallow region of the image that is closest to the array. In that regard, the system may generate beamformed transmit signals for the elements in order to produce a beam of ultrasound energy that is focused in the first focal zone. As mentioned above with respect to the method 400 shown in FIG. 11, the transmit aperture can comprise a plurality of contiguous and/or non-contiguous elements. For example, in some embodiments, the transmit aperture comprises only contiguous elements. In other embodiments, the transmit aperture may comprise one or more sparse elements in addition to the plurality of contiguous elements. In step 620, the system activates an expanded, sparsely-sampled aperture to receive ultrasound echoes from and generate electrical signals for the first focal zone. As explained above, in some embodiments, the transmit aperture and the sparsely-sampled receive aperture may comprise the same group of ultrasound transducer elements and multiplexer circuit. In that regard, activating the expanded aperture may include activating additional non-contiguous elements that were inactive during the transmit portion. The expanded receive aperture generates electrical signals which can then be sent to the processing system for beamforming, weighting, and image processing.

In step 630, the system selects and activates a transmit aperture to transmit ultrasound energy into a second focal zone of the anatomy. The second focal zone may comprise a region in the anatomy deeper than the first focal zone. The transmit aperture may comprise the same aperture as used in step 610, or may comprise a different transmit aperture. Because the ultrasound energy is directed to the second focal zone, the transmit signals sent to the elements of the transmit aperture may be different than those sent in step 610. For example, the beamformer may apply different delays to the transmit signals used in step 630 in order to generate an ultrasound beam focused in the second focal zone.

In step 640, the system switches from the MUX configuration used to transmit ultrasound energy in step 630 to a different, fully sparse MUX configuration that provides for an expanded, fully sparse receive aperture. The fully sparse receive aperture is selected and activated to receive the reflected ultrasound echoes from the second focal zone. In some embodiments, the fully sparse receive aperture may include only non-contiguous elements, or mostly non-contiguous elements. The fully sparse receive aperture may comprise the aperture illustrated in FIGS. 13-15, for example.

The electrical signals generated by the fully sparse receive aperture are sent to the processing system to be beamformed and further processed. Steps 630 and 640 can be repeated for additional focal zones, such as a third focal zone, a fourth focal zone, fifth focal zone, and so on. However, as mentioned above, the MUX switching that occurs in step 640 can produce image artifacts and degraded image quality in the shallow regions of an ultrasound image, such as the first focal zone. By using a multi-focal zone procedure where a fixed MUX configuration (i.e. no MUX switching) is performed to obtain imaging data of the first focal zone, and MUX switching is performed for the remaining, deeper focal zones, the image artifacts and degraded image quality can be avoided in the first focal zone, while a wider, fully sparse receive aperture can be used for the deeper focal zones to improve lateral resolution in those zones.

Figure 18:
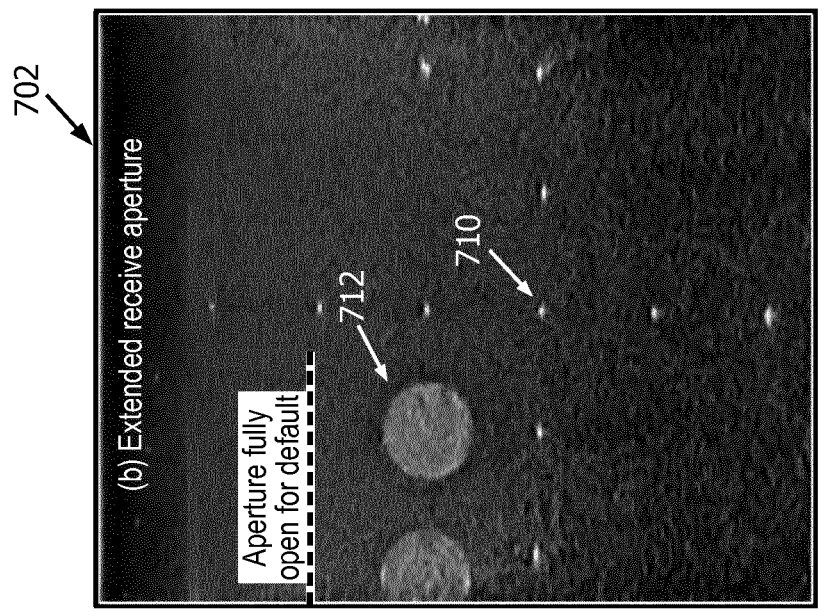
FIG. 18 is a B-mode image obtained by an ultrasound imaging system using an extended receive aperture, according to some aspects of the present disclosure.
Figure 17:
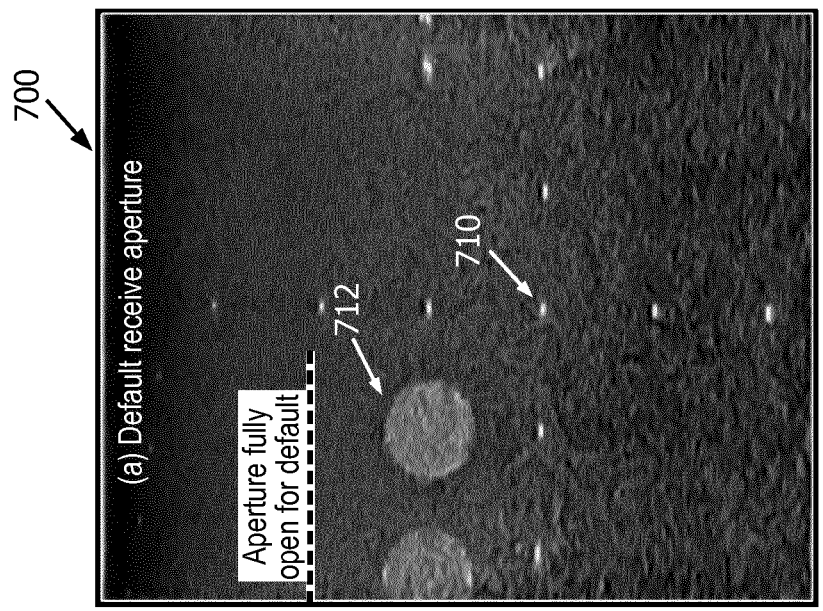
FIG. 17 is a B-mode image obtained by an ultrasound imaging system using a default receive aperture, according to some aspects of the present disclosure.

FIGS. 17 and 18 show two-dimensional ultrasound images obtained using a default receive aperture, and an extended receive aperture, respectively. The image 700 shown in FIG. 17 shows a reference circle, and reference cross hairs. These structures may comprise rods and/or wires extending into the image, such that the image 700 shows a two-dimensional slice of the three dimensional structure. The image 702, obtained using an extended receive aperture as described above, has improved lateral resolution relative to the image 700 obtained using the default receive aperture. The improved lateral resolution of the image 702 can be seen in the sharper boundaries of the reference circle 712, and the width of the center point of the cross hairs 710. Furthermore, the speckle pattern, shown as the background of the images 700, 702, is finer in the image 702 of FIG. 18 than the image 700 of FIG. 17.

Figure 19:
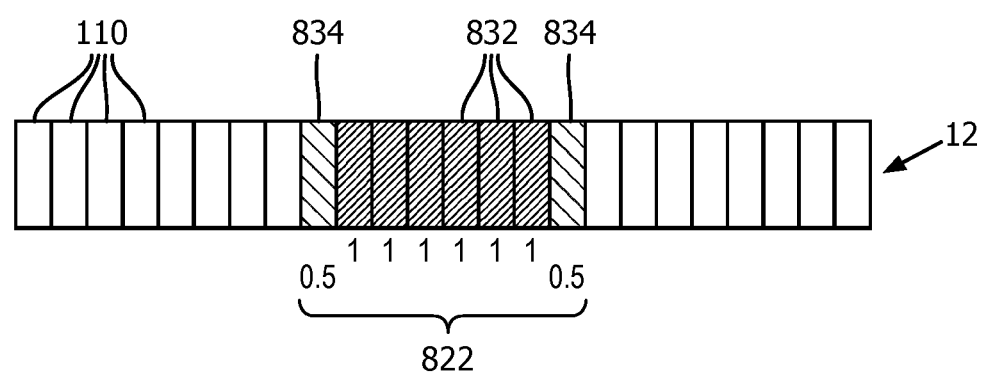
FIG. 19 is a diagrammatic view of the array of FIG. 2, with a weighted transmit aperture activated to transmit ultrasound energy into an anatomy.

FIG. 19 shows a weighted transmit aperture, according to some aspects of the present disclosure. Like the transmit aperture 122 shown in FIG. 3, the aperture 822 comprises a contiguous group of ultrasound transducer elements 832. The aperture 822 also includes weighted elements 834 at both ends of the aperture 822 to improve two-way or round-trip beampatterns. The weighted elements 834 can be described as the elements for which the transmit signals and/or the receive signals are weighted relative to the transmit signals and/or the receive signals generated by one or more non-weighted elements. The weighting can be carried out by, for example, a beamformer. In that regard, the beamformer is configured to provide a transmit signal for each of the contiguous ultrasound transducer elements 832 of the transmit aperture. The beamformer is also configured to apply different weight to at least one transmit signal generated by the aperture 822. The weighted elements 834 are weighted by a factor of 0.5 relative to the other, non-weighted contiguous elements 832. In other embodiments, the elements 832 can be weighted relative to the elements 834. For example, the contiguous elements 832 can be weighted by a factor of two relative to the sparse elements 834. In some embodiments, the aperture 822 may comprise more than two elements of varying weight, for example, 4, 6, 8, 10, etc. Furthermore, as described above, the array of FIG. 19 is shown for explanatory purposes, and the present disclosure contemplates various modifications of scale and arrangement of ultrasound transducer elements. For example, in some embodiments, the array 12 comprises tens, hundreds, or thousands of ultrasound transducer elements. In that regard, the aperture 822 may comprise many more ultrasound transducer elements than the embodiment shown in FIG. 19. For example, in some embodiments, the aperture 822 may comprise 62, 64, 94, 96, 128, 256, or more activated elements. In some embodiments, the array may comprise a 1.25-dimensional array, a 1.5-dimensional array, or a 2-dimensional array.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An ultrasound imaging system, comprising:
an ultrasound probe comprising:
an array of ultrasound transducer elements extending sequentially along a dimension and positioned at an end of the ultrasound probe;
electronic circuitry positioned in the ultrasound probe, in communication with the array of ultrasound transducer elements and configured to select a first receive aperture of the array of ultrasound transducer elements,
wherein the first receive aperture comprises:
a first subset of the array of ultrasound transducer elements and a second subset of the array of ultrasound transducer elements, wherein the first subset is positioned at a first end of the first receive aperture and the second subset is positioned at a second end of the first receive aperture opposite the first end;
a third subset of the array of ultrasound transducer elements positioned between the first subset and the second subset along the dimension,
wherein each element in the first receive aperture is contained in only one of the first subset, the second subset, or the third subset,
wherein the first receive aperture is configured to receive ultrasound echoes reflected from an anatomy and generate electrical signals representative of imaging data, and
wherein the electronic circuitry comprises:
one or more multiplexers, each multiplexer in communication with two or more non-contiguous elements of the array and configured to selectively transmit the electrical signals from one of the two non-contiguous elements of the array,
wherein at least one multiplexer is configured to select an element in the first subset or second subset;
a plurality of communication channels communicatively positioned between the electronic circuitry and a beamformer,
wherein the plurality of communication channels is configured to transmit the electrical signals generated by the first receive aperture to the beamformer,
wherein each of the one or more multiplexers is connected to a communication channel in the plurality of communication channels, and
wherein a total quantity of the ultrasound transducer elements of the array is greater than a total quantity of the plurality of communication channels; and
the beamformer in communication with the electronic circuitry and configured to:
receive the electrical signals generated by the first receive aperture;
apply a greater weight to the electrical signals generated by the first subset and the second subset than to the electrical signals generated by the third subset; and
output, to a display, an ultrasound image using the weighted electrical signals.

2. The ultrasound imaging system of claim 1, wherein the beamformer is configured to weight the electrical signals generated by the first subset and the second subset by a factor of two relative to the electrical signals generated by the third subset.

3. The ultrasound imaging system of claim 1,
wherein the first subset comprises at least one first non-contiguous ultrasound transducer element,
wherein the second subset comprises at least one second non-contiguous ultrasound transducer element,
wherein the third subset comprises a plurality of contiguous ultrasound transducer elements.

4. The ultrasound imaging system of claim 3, wherein the first receive aperture is symmetrical, such that the first receive aperture comprises a same number of non-contiguous ultrasound transducer elements on each side of the plurality of contiguous ultrasound transducer elements.

5. The ultrasound imaging system of claim 3,
wherein the electronic circuitry is configured to select a transmit aperture of the array of ultrasound transducer elements,
wherein the transmit aperture comprises a portion of the contiguous ultrasound transducer elements that is configured to transmit ultrasound energy into the anatomy.

6. The ultrasound imaging system of claim 5,
wherein the beamformer is configured to provide a respective transmit signal for each of the contiguous ultrasound transducer elements of the transmit aperture, and
wherein the beamformer is configured to apply a different weight to at least one transmit signal than a remainder of the transmit signals of the contiguous ultrasound transducer elements.

7. The ultrasound imaging system of claim 3,
wherein the electronic circuitry is configured to select the first receive aperture to receive the reflected ultrasound echoes from a first focal zone in the anatomy, and
wherein the electronic circuitry is configured to select a second receive aperture different from the first receive aperture to receive ultrasound echoes reflected from a second focal zone in the anatomy,
wherein the second receive aperture comprises a plurality of non-contiguous ultrasound transducer elements, and
wherein the second receive aperture is wider in the dimension than the first receive aperture.

8. The ultrasound imaging system of claim 7, wherein the second receive aperture comprises more non-contiguous ultrasound transducer elements than the non-contiguous ultrasound transducer elements of the first receive aperture.

9. The ultrasound imaging system of claim 7,
wherein the system is configured to switch a configuration of the one or more multiplexers to select the second receive aperture.

10. The ultrasound imaging system of claim 7, wherein the beamformer is configured to:
receive the electrical signals transmitted by the second receive aperture; and
apply a different weight to the electrical signals generated the second receive aperture than to the electrical signals generated by the first receive aperture.

11. A method for ultrasound imaging comprising:
selecting, by electronic circuitry of an ultrasound probe in communication with an array of ultrasound transducer elements of the ultrasound probe, a first receive aperture of the array of ultrasound transducer elements to receive ultrasound echoes reflected from an anatomy and generate electrical signals representative of imaging data, wherein the electronic circuitry is positioned in the ultrasound probe, wherein the array of ultrasound transducer elements extends sequentially along a dimension and is positioned at an end of the ultrasound probe, wherein the first receive aperture comprises:
- a first subset of the array of ultrasound transducer elements and a second subset of the array of ultrasound transducer elements, wherein the first subset is positioned at a first end of the first receive aperture and the second subset is positioned at a second end of the first receive aperture opposite the first end; and
- a third subset of the array of ultrasound transducer elements positioned between the first subset and the second subset along the dimension;

receiving, by the first subset, the second subset, and the third subset, ultrasound echoes reflected from an anatomy and generating electrical signals representative of imaging data;

receiving, by a beamformer communicatively coupled to the electronic circuitry via a plurality of communication channels, the electrical signals generated by the first receive aperture;

applying, by the beamformer, a greater weight to the electrical signals generated by the first subset and the second subset than to the electrical signals generated by the third subset; and outputting, to a display, an ultrasound image using the weighted electrical signals, wherein each element in the first receive aperture is contained in only one of the first subset, the second subset, or the third subset, wherein the electronic circuitry comprises:
- one or more multiplexers, each multiplexer in communication with two or more non-contiguous elements of the array and configured to selectively transmit the electrical signals from one of the two non-contiguous elements of the array, wherein at least one multiplexer is configured to select an element in the first subset or second subset, wherein the plurality of communication channels is configured to transmit the electrical signals generated by the first receive aperture to the beamformer, wherein each of the one or more multiplexers is connected to a communication channel in the plurality of communication channels, and wherein a total quantity of the ultrasound transducer elements of the array is greater than a total quantity of the plurality of communication channels.

12. The method of claim 11, wherein the applying the greater weight comprises weighting the electrical signal generated by the first subset and the second subset by a factor of two relative to the electrical signals generated by the third subset.

13. The method of claim 12,
wherein the receiving the ultrasound echoes reflected from the anatomy comprises receiving the ultrasound echoes reflected from a first focal zone in the anatomy, the method further comprising:
- selecting, by the electronic circuitry, a second receive aperture different from the first receive aperture to receive ultrasound echoes reflected from a second focal zone in the anatomy wherein the second receive aperture comprises a plurality of non-contiguous ultrasound transducer elements.

14. The method of claim 13, wherein the second receive aperture comprises only non-contiguous ultrasound transducer elements.

15. The method of claim 13,
wherein the selecting the second receive aperture includes switching a configuration of the one or more multiplexers.

16. The method of claim 13, further comprising:
receiving, by the beamformer, the electrical signals generated by the second receive aperture; and
applying a different weight to the electrical signals generated by the second receive aperture than to the electrical signals generated by the first receive aperture.

* * * * *